United States Patent [19]

Inoue et al.

[11] Patent Number: 4,989,029
[45] Date of Patent: Jan. 29, 1991

[54] CAMERA WITH CONTROL APPARATUS FOR CHARGING STORAGE CAPACITOR FOR FLASH LIGHT EMISSION

[75] Inventors: Manabu Inoue; Hiroyuki Okada, both of Osaka, Japan

[73] Assignee: Minolta Camera Kabushiki Kaisha, Osaka, Japan

[21] Appl. No.: 340,460

[22] Filed: Apr. 19, 1989

[30] Foreign Application Priority Data

Apr. 20, 1988 [JP] Japan .................................. 63-53365
Apr. 20, 1988 [JP] Japan .................................. 63-53366

[51] Int. Cl.$^5$ .............................................. G03B 7/00
[52] U.S. Cl. ..................................... 354/418; 354/471
[58] Field of Search ................... 354/418, 127.11, 471, 354/475, 465, 473, 472, 474; 315/151, 241 P

[56] References Cited

U.S. PATENT DOCUMENTS

| | | | |
|---|---|---|---|
| 4,200,371 | 4/1980 | Suzuki et al. | 354/21 |
| 4,201,463 | 5/1980 | Harigaya et al. | 354/86 |
| 4,290,677 | 9/1981 | Baumeister | 354/127 |
| 4,458,996 | 7/1984 | Harigaya et al. | 354/412 |
| 4,628,229 | 12/1986 | Inoue | 315/241 P |
| 4,630,916 | 12/1986 | Ishiguro et al. | 354/418 |
| 4,676,625 | 6/1987 | Alyfuki | 354/418 |
| 4,777,507 | 10/1988 | Dunsmore et al. | 354/418 |

FOREIGN PATENT DOCUMENTS

| | | |
|---|---|---|
| 54-5423 | 1/1979 | Japan . |
| 55-89823 | 7/1980 | Japan . |
| 57-629 | 1/1982 | Japan . |
| 60-138521 | 7/1985 | Japan . |
| 60-262145 | 12/1985 | Japan . |
| 61-22785 | 6/1986 | Japan . |
| 62-41298 | 10/1987 | Japan . |

Primary Examiner—L. T. Hix
Assistant Examiner—David M. Gray
Attorney, Agent, or Firm—Burns, Doane, Swecker & Mathis

[57] ABSTRACT

A control unit for charging capacitor for flash emission of a camera having an indication of "CHARGING" in a finder comprises a charging level detecting circuit for detecting level of charging of a capacitor for emitting flash, and a timer for measuring a time period required for charging the capacitor to a prescribed level when the charging level is lower than a prescribed flash emission level. The indication of the finder is controlled such that the "CHARGING" indication is not given when the time required for charging is shorter than the prescribed time period.

18 Claims, 9 Drawing Sheets

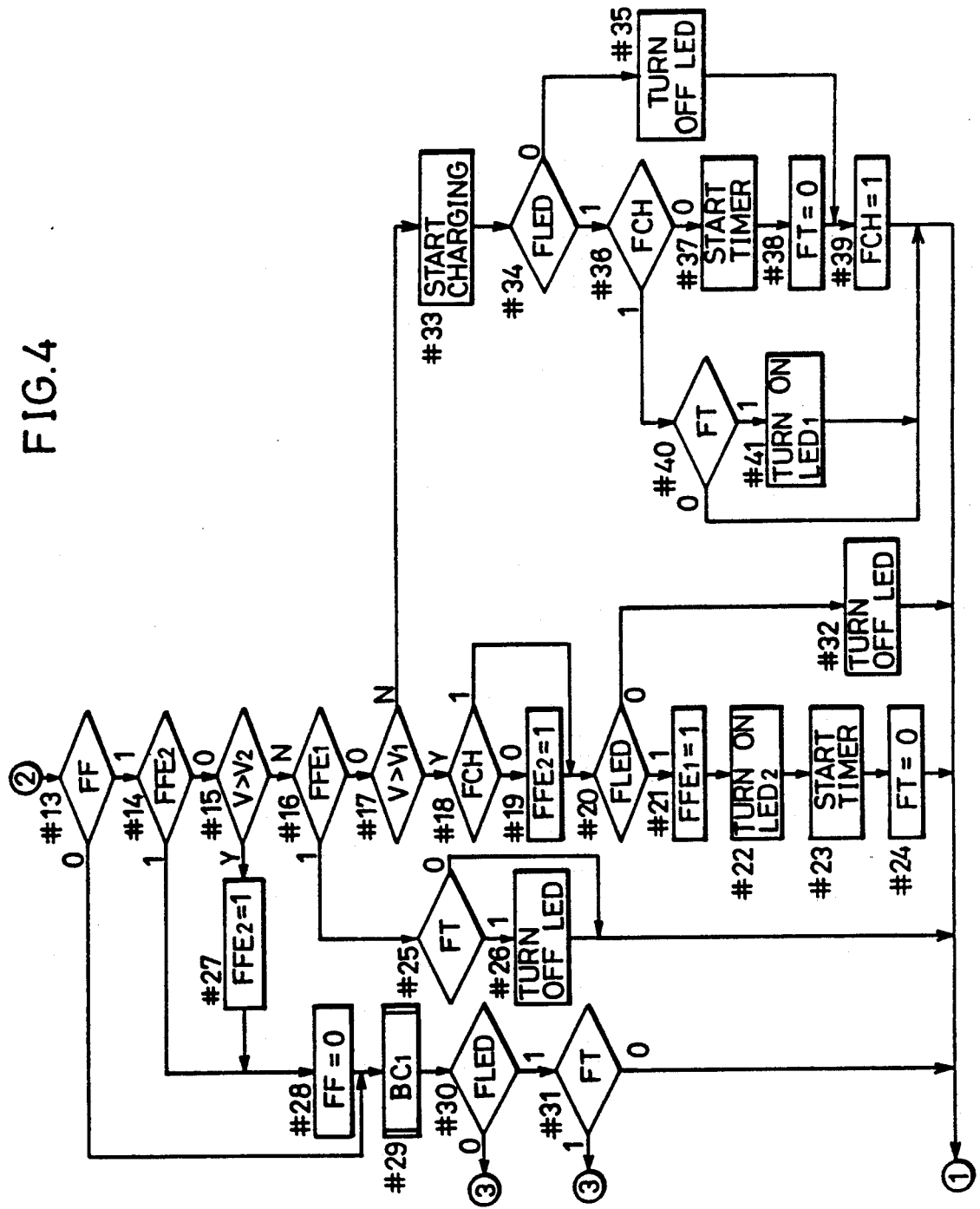

CAMERA WITH CONTROL APPARATUS FOR CHARGING STORAGE CAPACITOR FOR FLASH LIGHT EMISSION

BACKGROUND OF THE INVENTION

1. Field of the Invention

The present invention relates to a camera with a control apparatus for charging a storage capacitor for a flash light emission. More specifically, the present invention relates to a camera having a control apparatus for charging a storage capacitor for a flash light emission controlling a charging state indicator.

2. Description of Related Art

U.S. Pat. No. 4,628,229 discloses a control apparatus for charging a storage capacitor for flash light emission including a boosting circuit for boosting battery voltage, a capacitor which is charged with the output from the booster circuit, indicating means for indicating the state of charging of the capacitor during the operation of the boosting circuit, means for detecting voltage of the capacitor and means for stopping the operation of the boosting circuit when the voltage of the capacitor reaches a prescribed voltage. In this prior art, the indicating means indicates that the charging is being carried out whenever the charging of the capacitor is carried out by the boosting circuit.

If the indication of the charging state is always carried out while the capacitor is being charged, power is consumed for the indication, and there may be unnecessary power consumption. A method for preventing such unnecessary power consumption is disclosed in, for example, Japanese Patent Laying-Open Gazette No. 62145/1985. According to this gazette, indication of the completion of charging is carried out for only a prescribed time period after the fully charged state of the capacitor is detected in a control apparatus for charging a storage capacitor for a flash light emission.

Another method for preventing power consumption in association with the indication of fully charged state is disclosed in, for example, U.S. Pat. No. 4,630,916. According to this patent, a control apparatus for controlling charging of a storage capacitor for flash light emission comprises a timer and the state of charging of the capacitor is checked periodically in accordance with the measurement by the timer.

As described above, conventionally, indication in association with the state of charging is sometimes limited in consideration of reduction power consumption.

Now, electric flash is automatically emitted when low brightness is detected or when rear light is detected in cameras incorporating electric flash, which are popular recently. Therefore, the frequency of electric flash emission has been increased. Further, in a control circuit of the camera, whether the emission of electric flash is necessary or not for the next photographing operation cannot be determined until the brightness of a subject is measured while a shutter button is kept at the first stroke. Consequently, the capacitor for emitting electrical flash must be always kept at the fully charged state in order to minimize a release time lag caused by the charging of the electric flash.

For this purpose, if the capacitor for emitting electric flash is not fully charged, then charging must be started at the time when a lens barrier is changed from closed state to open state, when photographing operation with flash light emission is completed, when low brightness is detected, when rear light is detected and when a switch for forcing emission of electric flash is operated. At that time, indication of "charging is being carried out" is provided indicating whether or not photographing operation with flash light emission can be carried out, so that the user can determine the states of the camera.

Sometimes charging of the capacitor for emitting electric flash is started after a photographing operation without using the electric flash. If the "charging" indication is provided in such a case, the user is informed of the fact that the charging is started for flash light emission even though he did not use the electric flash. Consequently, the user may become anxious for the operation of the camera or he may have a complaint about the power consumption of the camera In addition, the time required for charging for the flash light emission has become very short recently, so that the time for charging is not an obstacle in the photographing operation in most cases If the voltage of the capacitor for emitting electric flash is slightly lower than the level allowing emission of flash, that level can be soon reached after the start of the charging operation. In such case, if the indication of charging state is provided after the start of the charging operation until the level allowing emission of flash is reached, then the user may stop photographing operation, being conscious of the fact that the camera is not fully charged.

Consequently, good chances for photographing may be missed. In most cameras, releasing operation is locked even if the shutter button is pressed when the capacitor for flash light emission is not fully charged. Therefore, the shutter button must be pressed again for releasing. In such cameras, repressing of the shutter button is needed because of the small time period for charging, which time is not essentially an obstacle in the photographing operation. Good chances for taking photographs may be missed in such cases also.

SUMMARY OF THE INVENTION

Therefore, one object of the present invention is to allow a user to devote himself to the photographing operation regardless of the state of charging of the camera.

Another object of thhe present invention is not to provide indication of "CHARGING" when such indication is not preferable from the view poinnt of the user in a camera.

A further object off the present invention is not to provide indication of "CHARGING" in a camera when the time required for charging for the flash light emission is short.

The above described objects off the present invention can be attained by a control apparatus for charging a storage capacitor for a flash light emission, comprising: a power supply serving as a driving source of the camera; a booster connected to the power supply for boosting a potential of the power supply to a prescribed potential; a capacitor connected to the booster for storing energy; a potential detecting apparatus for detecting the potential of the capacitor; a boosting operation starting signal outputting apparatus for outputting a signal to start boosting operation; a timer for measuring a prescribed time period in response to the said signal for starting the boosting operation; and an indicating apparatus for providing an indication corresponding to an output level from the potential detecting apparatus after a lapse of the prescribed time period; a first operating member for switching between a first state and a second state; controller for controlling said camera such that the camera is set in an operative state when said first operating member is in said first state and in an inoperative state when said member is in said second state; and a second operating member for starting the operation of said boosting operation starting signal outputting apparatus when said first operating member is in said first state.

Since the camera in accordance with the present invention comprises the above described components, when a booster is operated with the potential of the capacitor being lower than a prescribed level, the potential level of the capacitor is not indicated until a prescribed time period lapses away. Therefore, the user is not informed of the presence/absence of the charging to the capacitor in a prescribed time period in photographing operation. Therefore, the user can devote himself to the photographing operation regardless of the state of the camera.

In another aspect of the present invention, the camera comprises a power source serving as a driving source of the camera; a booster connected to the power supply to boost the potential of the power supply to a prescribed potential; a capacitor connected to the booster for charging energy; a potential detecting apparatus for detecting the potential of the capacitor; an indicating apparatus for indicating an operating state of the booster; and an inhibiting apparatus for inhibiting indication of the indicating apparatus under a prescribed condition.

Since the camera in accordance with the present invention comprises the above described components, the indication of "being charged" is not provided even if the capacitor is charged, when the user does not intend photographing operation using electronic flash, so that there is no possibility of the user missing a good chance of photographing. Therefore, a camera can be provided in which the indication of "being charged" is not provided when such indication is not preferable from the view point of the user.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3 to 9 are flow charts for illustrating the operation of the camera to which the present invention is applied.

DESCRIPTION OF THE PREFERRED EMBODIMENTS

Figure 1:
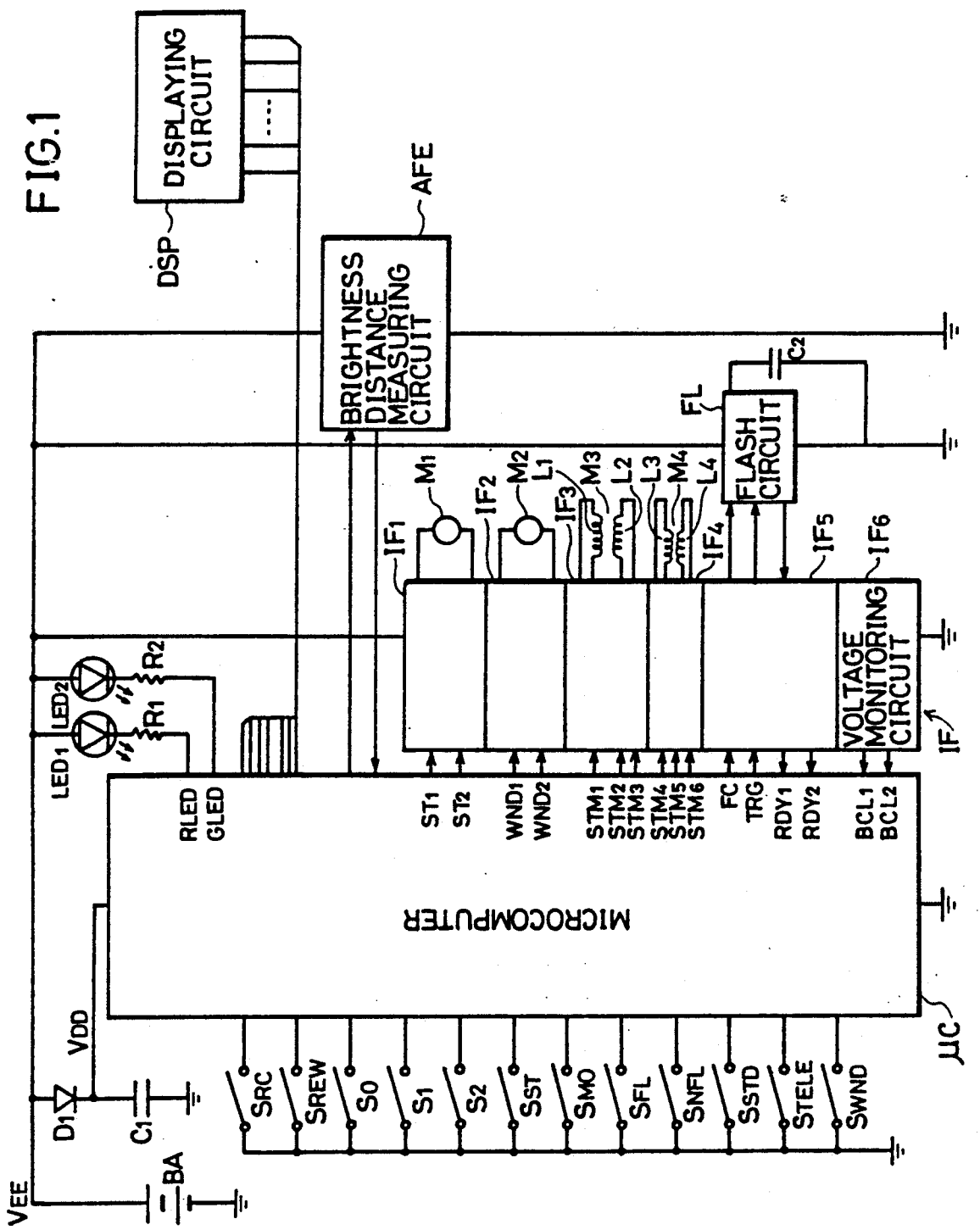
FIG. 1 is a block diagram showing whole circuit structure of a camera to which the present invention is applied.

FIG. 1 is a block diagram showing the whole circuit structure of a camera to which the present invention is applied. Power is directly supplied to a flash circuit FL, a brightness measuring·distance measuring circuit AFE, light emitting diodes LED1, LED2 and to an interface IF through a power supply line $V_{EE}$ from a power supply battery BA such as a lithium battery. A series circuit including a diode D1 and a capacitor C1 is connected in parallel to the power supply battery BA. As power is supplied to a microcomputer $\mu C$ through a power supply line $V_{DD}$ from a node between the diode D1 and the capacitor C1. The capacitor C1 has a relatively large capacitance and power is supplied from the capacitor C1 to the power supply line $V_{DD}$ when the power supply battery BA is to be changed. On this occasion, the reverse flow of current from the capacitor 1 to the power supply line $V_{EE}$ is prevented by the diode D1. When a large current flows from the power supply battery BA because of the boosting operation of the flash circuit FL or by the activation of the motors M1 to M4, the voltage on the power supply line $V_{EE}$ is decreased due to the influence of the internal resistance of the power supply battery BA. In that case also, the diode D1 prevents reverse flow of current from the capacitor C1 to the power supply line $V_{EE}$. Therefore, the voltage of the power supply line $V_{DD}$ of the microcomputer $\mu C$ is stable, whereby the microcomputer $\mu C$ is operated without fail and there is no possibility of the microcomputer $\mu C$ malfunctions.

Various switches are connected to input ports of the microcomputer $\mu C$. Each of these switches will be described with following.

A switch $S_{RC}$ is turned ON/OFF in correspondence with opening/closing of a back lid of the camera. The switch $S_{RC}$ is turned ON when the back lid is opened, and it is turned OFF when the back lid is closed.

A switch $S_{REW}$ is operated to force rewinding of a film. The switch $S_{REW}$ is normally OFF and when it is manually turned ON, rewinding of the film is started. Once rewinding is started, the fact that the rewinding is being carried out is stored in the microcomputer $\mu C$, so that the rewinding operation is continued until the film is fully rewound even if the switch $S_{REW}$ is turned OFF.

A switch SO is turned ON/OFF in correspondence with opening/closing of a lens barrier of a camera, which turns ON when the lens barrier is opened and is turned OFF when the lens barrier is closed. The photographing operation is prohibited when the lens barrier is in a closed state.

A switch S1 is a brightness measuring.distance measuring switch which is closed by a first stroke of depression of a shutter button. The brightness measuring.distance measuring operation is carried out by turning ON the switch S1.

A switch S2 is a release switch which is closed by a second stroke, which is longer than the first stroke, of depression of the shutter button. The microcomputer $\mu C$ carries out a release sequence when this switch is turned ON.

A switch $S_{ST}$ is for switching focal length of a lens, which is normally OFF. The focal length of the lens is switched everytime this switch $S_S$ is turned ON.

A switch $S_{MO}$ is for switching photographing mode of a camera, which is normally OFF. Photographing mode of the camera is switched everytime this switch $S_{MO}$ is turned ON.

A switch $S_{FL}$ is to force emission of electric flash, which is turned ON to take a photograph with electric flash. This switch $S_{FL}$ is normally OFF. When the releasing operation is carried out with this switch $S_{FL}$ being ON, photographing operation is carried out with the electric flash forcedly emitted.

A switch $S_{NFL}$ is a flash emission inhibiting switch which is turned ON when electronic flash is not to be emitted. This switch $S_{NFL}$ is normally OFF. If the releasing operation is carried out with this switch $S_{NMFL}$ being ON, there will be no emission of electric flash regardless of the photographing conditions.

These switches $S_{ST}$, $S_{MO}$, $S_{FL}$, and $S_{NFL}$ are push switches which are turned ON when they are pressed and turned OFF when the pressure is removed.

$S_{STD}$ and $S_{TELE}$ are switches for detecting focal length of a lens. When the photographing lens is at a wide angle position (shorter focal length), then the wide angle position detecting switch $S_{STD}$ is turned ON. When the photographing lens is at a telephoto position (longer focal length), then the telephoto detecting switch $S_{TELE}$ is turned ON. If the photographing lens is a zoom lens, a node of a zoom encoder generating a signal corresponding to the focal length of the lens may be used instead of these switches $S_{STD}$ and $S_{TELE}$.

A switch $S_{WND}$ is a switch for detecting one frame position of a film, which is associated with a sprocket for feeding the film. This switch $S_{WND}$ is turned ON everytime one frame of the film is fed.

One end of each of these switches is grounded and the other end of each of these switches is connected to an input terminal of the microcomputer $\mu C$. The input terminal of the microcomputer $\mu C$ are pulled up to a prescribed potential in the microcomputer. Therefore, the other end of each switch reaches "high" level when the switch is OFF and "low" level when the switch is ON. These levels are detected by the microcomputer $\mu C$ to determined the ON/OFF state of each switch.

A first light emitting diode LED1 emits red light, which is used to indicate that a capacitor C2 of the flash circuit FL is being charged. A second light emitting diode LED2 emits green light, which is used to indicate that the charging is completed. The light emitting diodes LED1 and LED2 have their nodes connected to the power supply line $V_{EE}$ and their cathodes connected to the output ports RLED and GLED of the microcomputer $\mu C$, respectively, through resistances R1 and R2 for controlling current. When the levels of these output ports RLED and GLED become "low", the corresponding light emitting diodes LED1 and LED2 are respectively turned on, and when they become "high", the corresponding light emitting diodes LED1 and LED2 are turned OFF, respectively. The control of on/off of the respective light emitting diodes LED1 and LED2 is carried out in this manner by the microcomputer $\mu C$.

A displaying circuit DSP is constituted by an LCD (liquid crystal display) and the like arranged on the body of the camera. The number of exposed films, photographing mode, battery warning display, presence/absence of the film, warning of the operation of the camera and so on are displayed in accordance with data provided from the microcomputer $\mu C$. A brightness measuring.distance measuring circuit AFE measures brightness of the subject and the distance to the subject in accordance with instruction from the microcomputer $\mu C$ and transmits the results of measurement to the microcomputer $\mu C$.

A motor M1 for switching focal length, a motor M2 for feeding film and stepping motors M3 and M4 of two phase exciting bipolar driving type are provided. When the stepping motor M3 is rotated in the forward direction, the lens is moved forward, and when it is rotated in the reverse direction, the lens is moved to its initial position. When the stepping motor M4 is rotated in the forward direction, the shutter is opened, and when it is rotated in the reverse direction, the shutter is closed.

The flash circuit FL charges the capacitor C2 to a high voltage and discharges a xenon lamp by the energy charged in this capacitor C2 to emit flash light to an object. The flash circuit FL comprises a boosting circuit (DC-DC converter) for charging the capacitor C2 and a voltage detecting circuit for detecting the voltage level of the capacitor C2.

The motors M1, M2, the stepping motors M3, M4, the flash circuit FL and so on are connected to the microcomputer $\mu C$ through an interface IF. The interface IF comprises interfaces IF1 to IF6, each of which will be described in the following.

The interface IF1 is to control the motor M1 for switching focal length. Four states of the motor M1 for switching the focal length, namely, forward rotation, reverse rotation, breaking and stopping of power supply are controlled by combinations of output signals from the output ports ST1 and ST2 of the microcomputer $\mu C$ which are outputted through the interface IF1.

The interface IF2 is provided for controlling the motor M2 for feeding films. The control of the motor M2 such as winding/rewinding of the film, breaking, stopping of power supply are carried out by the combination of the output from from the output ports WND1 and WND2 of the microcomputer $\mu C$.

The interface IF3 is provided for controlling the stepping motor M3. The stepping motor M3 is controlled in response to the output from the output ports STM1 to STM3 of the microcomputer $\mu C$. The output port STM1 controls the direction of the current to be flown through a first coil L1 of the stepping motor M3, the output port STM2 controls the direction of a current to be flown to a second coil L2, and the output port STM3 controls ON/OFF of power supply of the coils L1 and L2.

The interface IF4 is provided for controlling the stepping motor M4. The stepping motor M4 is controlled in response to the output from the output ports STM4 to STM6 of the microcomputer $\mu C$. The output port STM4 controls the direction of a current to be flown to the first coil L3 of the stepping motor M4, the output port STM5 controls the direction of a current to be flown to the second coil L4, and the output port STM6 controls ON/OFF of power supply of the coils L3 and L4.

The interface IF5 is provided for controlling the flash circuit FL. Control of starting/stopping of boosting operation of a boosting circuit provided in the flash circuit FL is carried out in accordance with the state of the output port FC of the microcomputer $\mu C$. Control of emission of light from the flash circuit FL is carried out in accordance with the state of an output port TRG. In addition, the interface IF5 provides output of the voltage detecting circuit in the flash circuit FL to input port RDY1 and RDY2 of the microcomputer $\mu C$. The interface IF5 normally outputs a "high" level signal to the input ports RDY1 and RDY2 of the microcomputer $\mu C$. However, when the voltage V of the capacitor C2 exceeds the level V1 (for example 270V) allowing emission of flash light, the interface IF5 outputs a "low" level signal to the input port RDY1 and when the voltage reaches the level V2 (for example 300V) for stopping the charging operation, it outputs a "low" level signal to the input port RDY2.

A voltage monitoring circuit IF6 is provided for checking the power supply battery BA. The voltage monitoring circuit applies the result of determination of the voltage level on the power supply line $V_{EE}$ to input ports BCL1 and BCL2 of the microcomputer μC. The input ports BCL1 and BCL2 are both at the "high" level when the voltage of the power supply battery BA is at a normal level. When the voltage of the power supply battery BA reaches a preliminary warning level for changing the battery, the input port BCL1 is set at the "low" level, and when the voltage reaches warning level of changing the battery (release lock level), then the input port BCL2 is also set at the "low" level. The warning level of changing the battery is set higher than the lowest operational voltage level of the camera, and the preliminary warning level of changing the battery is set higher than the warning level. It goes without saying that the normal is higher than the preliminary warning level.

Figure 2:
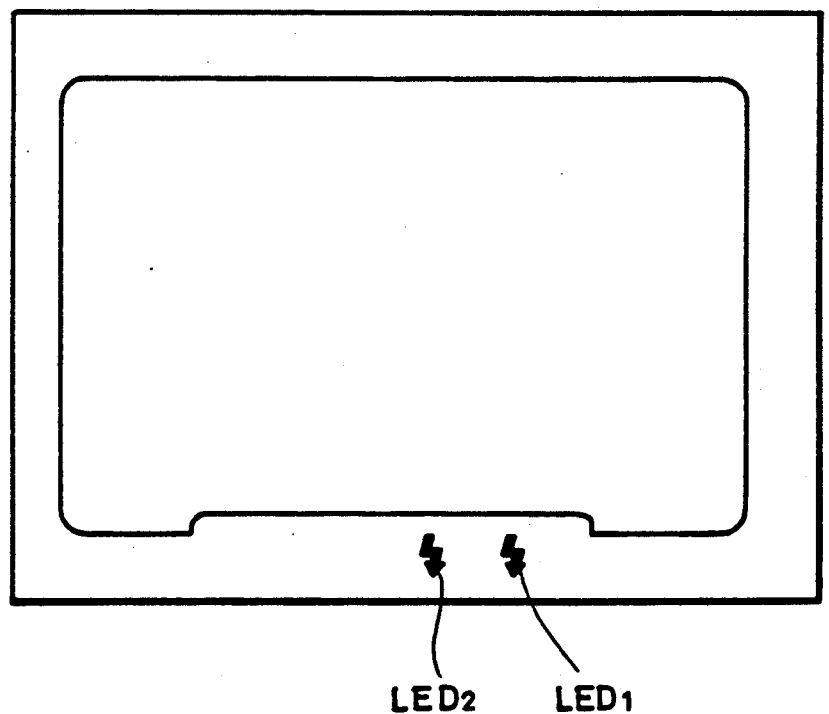
FIG. 2 illustrates indication on a finder.

FIG. 2 illustrates indication on a finder of a camera in accordance with the present embodiment. In the figure, a portion surrounded by the inner frame is the view field of the finder. The light emitting diodes LED1 and LED2 which were described above are arranged outside of the view field. The red light emitting diode LED1 is to indicate that "charging is being carried out". If this indication is provided, it means the charging for the flash is now being carried out and the emission of flash is not yet possible. The green light emitting diode LED2 is to indicate the completion of the charging operation. If this indication is provided, it means that the emission of flash is possible.

The operation of this embodiment will be described in the following with reference to the flow chart.

Figure 8:
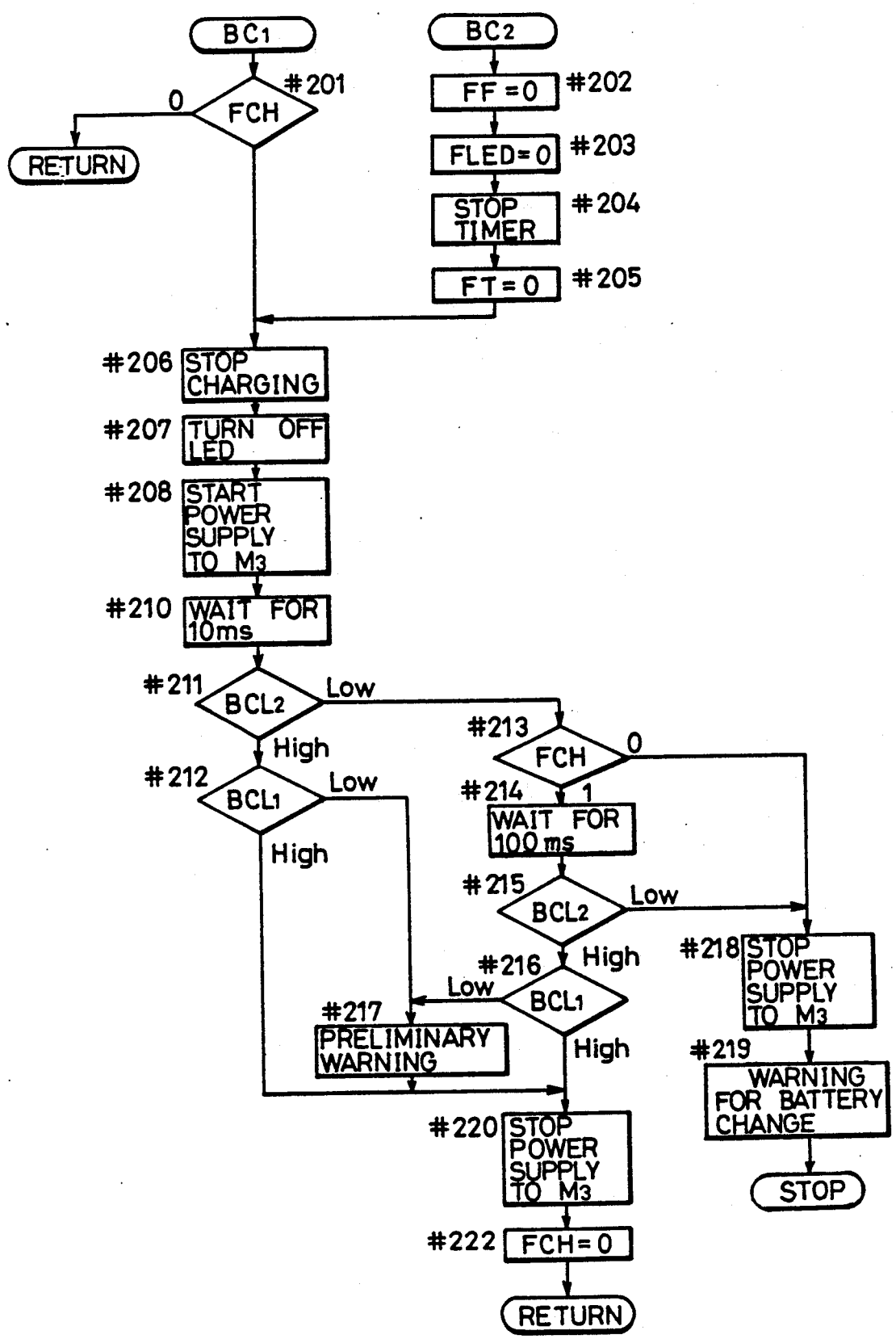

First, referring to FIG. 8, a subroutine for checking battery will be described. The battery check subroutine comprises two subroutines, that is, BC1 and BC2. The subroutine BC1 is called when the battery is to be checked during charging of the flash. The subroutine BC 2 is called when the battery is to be checked independent from the charging of the flash.

When the subroutine BC1 is called, whether a flag FCH is 1 or 0 is checked in the step #201 of FIG. 8 (hereinafter the term step will be omitted). The flag FCH is a flag indicating that the charging is being carried out, which becomes 1 while the flash is being charged, and becomes 0 when charging is not carried out. If FCH = 0 in #201, then the program directly returns to the main flow, so that no operation is carried out when the flash is not being charged. If FCH = 1 in #201, then the charging is stopped in #206. After the LEDs are turned off in #207, the program proceeds to #208 where power supply to the stepping motor M3 is started and a load is provided on the power supply battery BA. The phase of the driving waveforms applied to the stepping motor MC3 when power is supplied to the stepping motor M3 in #208 is adapted not to rotate the stepping motor M3. Thereafter, in #210 the program is kept in a waiting state for a time period (for example 10 msec) required for the settlement of the battery voltage to carry out exact battery checking, and thereafter the state of the input port BCL2 is checked in #211. The input port BCL2 becomes "low" when the voltage of the power supply battery BA is lower than the release lock level, as described above. If the input port BCL2 is at the "high" level, that is, when the battery voltage is higher than the release lock level, the flow proceeds to #212 where the state of the input port BCL1 is checked. If the input port BCL1 is "high" in this step, it means that the battery is sufficient, so that the program proceeds to #220 without warning. If the input port BCL1 is at the "low" level in #212, then the program proceeds to #217 where preliminary warning for changing the battery is given by the displaying circuit DSP. Thereafter, the program proceeds to #220, in which it is stopped to supply the power to the stepping motor M3. Then the charging flag FCH is set to 0 in #222, thus terminating the battery check. If the input port BCL2 is at the "low" level in the above mentioned step #211, then the program proceeds to #213. In this step, whether the charging was being carried out or not at the time of execution of this routine is determined by the charging flag FCH. If the charging was being carried out (FCH = 1), then the fact that the input port BCL2 is at the "low" level in #211 may be caused by the temporarily decrease of the voltage of the power supply battery BA derived from the flash charging operation. More specifically, the power supply battery BA has a characteristic such that the output voltage is considerably lowered by the influence of the internal resistance in the power supply battery BA when a large current is flown as in the case of charging the flash. In that case, it takes considerably long time period for the power supply battery BA to return to the original output voltage after the large current is stopped, dependent on the state of the power supply battery. Therefore, the program proceeds to #214 to be kept in a waiting state for a time period (for example 100 msec) necessary for the recovery of the output voltage of the power supply battery BA. Thereafter, the state of the input port BCL2 is again checked in #215. If the input port BCL2 is still at the "low" level, the power supply battery BA is considered to be actually consumed, so that the program proceeds to #218 where the power supply to the stepping motor M3 is stopped, the warning for changing the battery is given, and the program stops.

If it is determined in the step #213 that the power supply voltage BA is not in the charging operation (FCH = 0) at the time when the subroutine for the battery check is executed, then the result of determination on the input port BCL2 in the step #211 is determined to be reliable. Therefore, the program proceeds to #218 the warning for changing the battery is given and the program stops. If the input port BCL2 is at "high"level in #215, then the program proceeds to #216 where the state of the input port BCL1 is checked. If the input port BLC1 is also at the "high" level, then the program proceeds to #220. If the input port BCL1 is at the "low" level in #216, then a preliminary warning for changing the battery is given in #217 and the program proceeds to #220. The operation after the step #220 is the same as described above.

When the second subroutine BC2 for checking the battery is called, then the charging requesting flag FF is set to 0 in #202 and an indication requesting flag FLED is set to 0 in #203. The charge requesting flag FF is set to 1 when charging is necessary and it is set to 0 when charging is not necessary. The indication requesting flag FLED is set to 1 when indication of "being charged" or the indication of completion of charging is necessary and it is set to 0 when such indication is unnecessary. How to set and use this flag will be described later.

Figure 5:
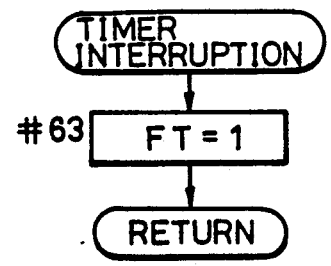

Thereafter, the program proceeds to #204 where the timer is stopped, and a timer interruption flag FT is set to 0 in #205. This timer is used for controlling the indication of charging or indication of completion of charging, which will be described later. The timer interruption flag FT is set to 1 when a timer interruption is generated, as shown in FIG. 5. Thereafter, the program proceeds to #206 and the same procedure as described above is carried out.

As described above, when the battery checking is to be carried out during charging of the flash, the charging of the flash is stopped and a load is applied on the power supply battery BA to check the voltage. If the power supply battery BA is new or if the charging current becomes small as the charging of the capacitor C2 for emitting flash light is almost completed, then the influence of a large load of charging the flash is small. Therefore, the checking of the battery can be accurately carried out only by this operation, so that the program directly proceeds to the next step. Therefore, the time for checking the battery can be saved. If the power supply battery BA is old, or if the load by the charging of the flash is large since a large charging current is required to charge the capacitor C2, which is caused by the low voltage of the capacitor C2, then the output voltage of the power supply battery BA is lowered by the influence of the load, as described above. Therefore, even if the load is removed, the battery voltage does not directly return to the original level. Therefore, accurate checking of the battery is enabled by checking the battery again after a time period required for the return of the output voltage of the battery BA.

Figure 3:
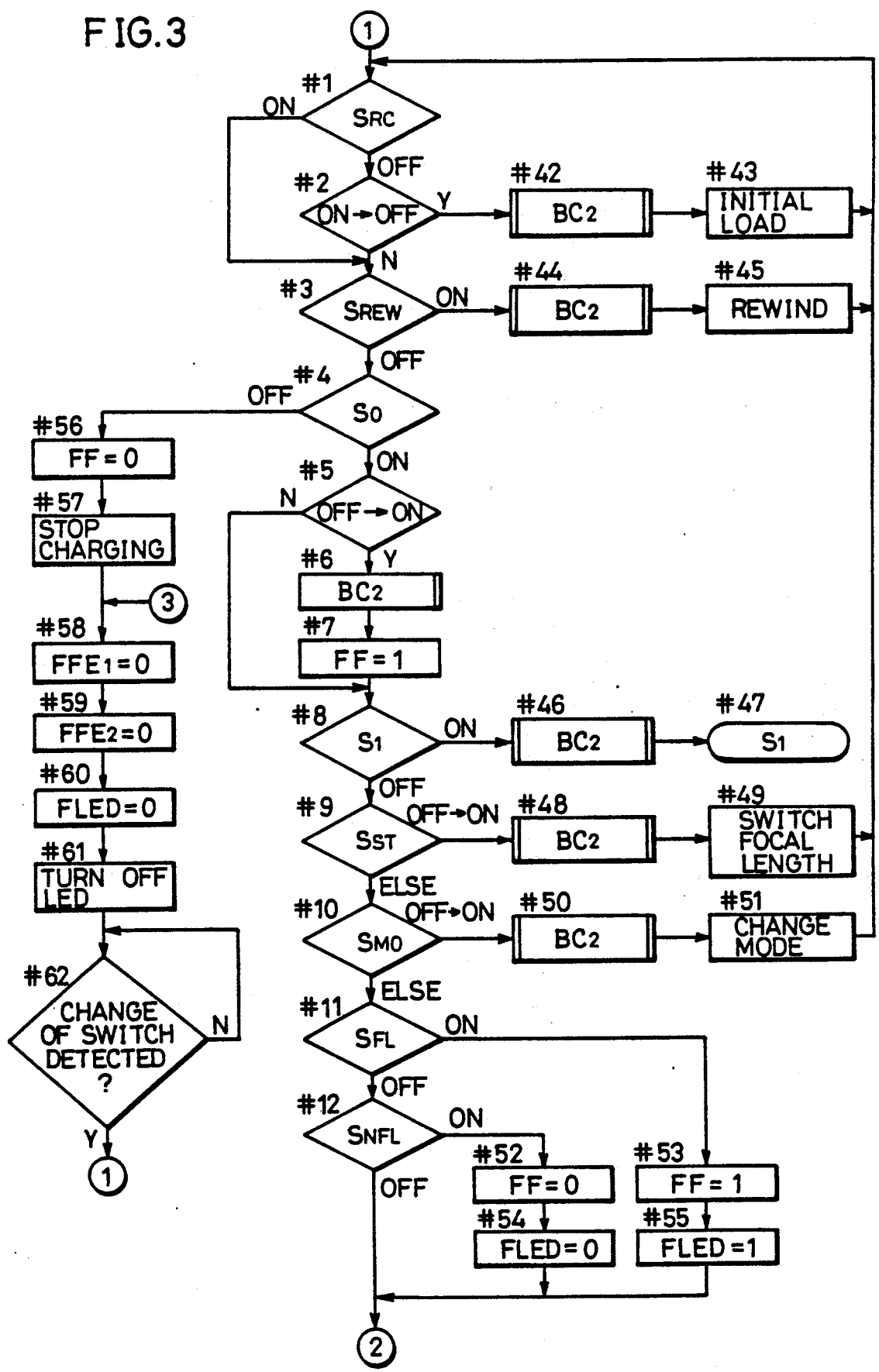

The operation in accordance with the photographing operation of the camera will be described with reference to FIG. 3. Normally, when the camera is not operated, the microcomputer $\mu C$ is kept in a standby state at #62 of FIG. 3. In the step #62, whether there is a change in the state of the input port connected to respective switches is checked. If there is a change, the program proceeds to #1, and otherwise the said checking is repeated. If there is a change in the state of any of the switches, the microcomputer $\mu C$ goes out of the step #62 to proceed to the step #1. First, in #1, the ON/OFF of the back lid switch $S_{RC}$ is checked. As described above, the back lid switch $S_{RC}$ is ON when the back lid is open, and the switch $S_{RC}$ is OFF when the back lid is closed. If the back lid switch $S_{RC}$ is ON, the program proceeds to #3. If the switch $S_{RC}$ is OFF, then it proceeds to #2. In the step #2, whether the back lid switch $S_{RC}$ has been OFF or the back lid switch $S_{RC}$ is turned from ON to OFF is determined. If the state of the back lid switch $S_{RC}$ is changed from ON to OFF, then it means that the back lid of the camera is just closed. Therefore, the subroutine BC2 for checking the battery as described above is carried out in #42, and initial loading of the film is carried out in #43 If the back lid switch $S_{RC}$ have been off, the program proceeds to #3.

In #3, ON/OFF of the rewind switch $S_{REW}$ is checked. If the rewind switch $S_{REW}$ is ON, then the subroutine BC2 for checking the battery is carried out in #44 and rewind control is carried out in #45. If the rewind switch $S_{REW}$ is OFF in #3, then the program proceeds to #4. In #4, ON/OFF of the lens barrier switch S0 is checked. As described in the foregoing, the lens barrier switch S0 in ON when the lens barrier is open, and the lens barrier S0 is OFF when the lens barrier is closed. If the lens barrier switch S0 is OFF, it is clear that the user does not intend photographing operation, so that in the steps #56 to #61 various flags are reset, charging the capacitor C2 is stopped, and the light emitting diodes LED1 and LED2 are turned off, and the program is kept in the waiting state in #62. If the lens barrier switch S0 is ON in #4, then the program proceeds to #5. In #5, whether the lens barrier switch S0 has been ON or the switch is changed from OFF to ON is determined, and if the switch has been ON, then the program proceed to the step #8. If the state is changed from OFF to ON, then it proceeds to #6. In #6, the above described subroutine BC2 for checking the battery is called and the battery is checked in the manner as described above. If the level of the power supply battery BA is higher than the release lock level in the subroutine BC2, then the program returns to #7 where the charge requesting flag FF is set to 1. Thereafter the program proceeds to #8. The charge requesting flag FF is used for determining in the subsequent step whether the operation for charging has carried out or not. If the lens barrier switch S0 is changed from OFF to ON, it means that preparation for photographing is necessary, and therefore the flash must be charged. Consequently, the charge requesting flag FF is set to 1. In #8, the ON/OFF of the brightness measuring.distance measuring switch S1 is checked. If the switch S1 is ON in #8, then the subroutine BC2 for checking the battery is called, and if the level of the power supply battery BA is higher than the release lock level, then the program returns to start the operation for measuring brightness and distance in #47 (see FIG. 7). If the switch S1 is OFF in #8, then the program proceeds to #9.

In #9, whether the state of the switch $S_{ST}$ for switching the focal length is changed from OFF to ON or not is determined. If the state of this switch $S_{ST}$ changes from OFF to ON, then the subroutine BC2 for checking the battery is called in #48, and if the voltage is higher than the release lock level, the program returns and the focal length is switched in #49. If the state of the switch $S_{ST}$ is not changed from OFF to ON in #9, then the program proceeds to #10.

In #10, whether the state of the photographing mode switching switch $S_{MO}$ is changed from Off to ON or not is determined. If the state of this switch is changed from OFF to ON, then the subroutine BC2 for checking the battery is called in #50. If the level of the power supply battery BA is higher than the release lock level, the program returns to #51 where the mode is changed. If the state of the switch SMO is not changed from OFF to ON, then the program proceeds to #11.

In #11, the ON/OFF of the switch $S_{FL}$ for forcing emission of the electric flash is checked. If it is OFF, then the program program proceeds to #12. Otherwise the program proceeds to #53. In #53, the charge requesting flag FF is set to 1, the indication requesting flag FLED is set to 1 in #55 and the program proceeds to #13. The indication requesting flag FLED is a flag for determining whether the indication of the state of charging is to be provided or not when charging of the flash is carried out. Now, the switch $S_{FL}$ for forcing emission of electric flash is ON, that means the user starts charging of the flash at his will. Therefore, the state of charging is indicated so as to make clear when the photographing operation is made possible. Consequently, it is convenient for the user to take a good chance for photographing, and the user may not be anxious awaiting the end of charging. On the contrary, if the above described lens barrier switch S0 is changed from OFF to ON, the indication requesting flag FLED is not set. The reason for this is that the turning ON of the lens barrier switch S0 is not always the operation in consideration of photographing with flash light emission for the user, and therefore the indication of the state of charging is not provided. Consequently, there will be no confusing indication and unnecessary power consumption can be prevented.

In #12, ON/OFF of the flash emission inhibiting switch $S_{NFL}$ is checked. If the switch $S_{NFL}$ is OFF in #12, then the program proceeds to #13. If the switch $S_{NFL}$ is ON in #12, the program proceeds to #52. In #52, the charge requesting flag FF is set to 0, in #54 the indication requesting flag FLED is set to 0 and the program proceeds to #13 of FIG. 4.

The procedure from the step #13 is a routine for controlling the charging of the flash and the indication of the state of charging. Before the explanation of this procedure, charging non-requested flag FFE1 and FFE2 are explained. In this system, there are two levels for determining the state of charging of the capacitor C2, that is, the level V1 allowing emission of flash and the level V2 at which the charging is stopped. The level V1 is set to be lower than V2. If a camera is not used for a long period of time, then the level of the capacitor C2 is usually becomes lower than the level V1 allowing the emission of flash, due to the leak current or the like. On this occasion if the lens barrier is opened or if the switch $S_{FL}$ for forcedly emitting flash is turned ON, the charging of the capacitor C2 is started, the level of charging of the capacitor C2 exceeds the level V1 allowing the emission of flash, and the charging is stopped at that level V2 for stopping charging. Once the charging level of the capacitor C2 reaches the level V2, the voltage level of the capacitor C2 gradually lowers due to the leak current or the like, but the emission of flash is possible provided that the voltage level of the capacitor C2 is higher than the level V1. Therefore, when the voltage V of the capacitor C2 is between the level V1 allowing the emission of flash and the level V2 at which the charging is stopped, for example, there is no need to carry out charging even if an operation to start charging is done. The unnecessary power consumption of the battery should be prevented. Therefore, when the voltage V of the capacitor C2 is between the level V1 and the level V2, whether the voltage V has been at that level or the charging is now being carried out must be determined. In the former case, charging is not carried out. In the later case, the charging operation is continued. For this determination, the charging non-requested flag FFE2 is used.

After the capacitor C2 is charged and the voltage V reaches the level V1 allowing emission of flash, the light emitting diode LED2 for indicating the completion of charging is turned on for a prescribed time period. The flag FFE1 is a flag provided for the above described determination, indicating whether the light emitting diode LED2 for indicating the completion of charging is turned on or not. The control of the turning ON of the light emitting diode LED2 will be described later.

In #13, the charge requesting flag FF is checked. If the charging operation is not carried out (FF=0), then the program proceeds to #29. If FF=1, in #13, then the program proceeds to #14. If the charging operation need not be started nor continued even though the charging operation is carried out (FFE2=1 in #14), the program proceeds to #28. Even when the flag FF is set and the flag FFES is reset, if it is determined in #15 the voltage V of the capacitor C2 reached the level of V2, then the charging non-requested flag FFE2 is se in #27 and the program proceeds to #28. The charging requesting flag FF is reset in #28 and the above described subroutine BC1 for checking the battery is called in #29. If the capacitor C2 is being charged, the charging is stopped, the battery is checked and the program proceeds to the steps #30 and #31. If these steps #30 and #31, whether the light emitting diode LED1 or LED2 is ON or not is checked. If either one is on, the program returns to the step #1 and the above described operation is repeated. If it is off, that is, if the indication requesting flag FLED of the light emitting diode LED1 or LED2 is reset (in #30) or if the prescribed time period has lapsed after the turning on of the LED (FT=1) (in #31), then the program proceeds to steps #58 to #61, where flags are reset, the light emitting diode LED1 or LED2 is turned off, and the program is kept in the waiting state in #62.

If it is determined in #13 to #15 that it is necessary to start or continue charging, then the indication flag FFE1 is checked in #16 to determine whether the light emitting diode LED2 has been turned on or not. If the light emitting diode LED2 has been on, then whether a prescribed time period has lapsed or not after the start of the turning on of the diode is determined in #25. If the prescribed time period has lapsed (FT=1), the light emitting diode LED2 is turned off in #26. Thereafter, the program proceeds to the step #1 and the same operation is repeated.

When FF=1, FFE2=0, V≦V2 and FFE1=0 in #13 to #16, whether V is larger than V1 is checked in #17. If V>V1, the charging is started or continued in #33, the indication requesting flag FLED is checked in #34 to determine whether the indication of charging should be provided or not. If FLED=1 in #34, then the charging flag FCH is checked in #36 in order to determine whether the charging is started in #33 or the charging has been carried out. If FLED=0 in #34, then both LEDs are turned off in #35. If FCH=0 in #36, it means that the charging is started first in the step #33, so that the timer is started in #37 and the timer interruption flag FT is reset in #38. The timer is used for turning on the light emitting diode LED1 for indicating that the charging is being carried out not directly after the start of charging but after a lapse of a timer period (for example 0.3 sec.). More specifically, if the voltage V of the capacitor C2 is a little lower than the level V1 allowing emission of flash light, the voltage V of the capacitor C2 soon reaches the level V1 after the start of charging. In such a case, there is no difference in actual use of the camera as in the case where the capacitor has been enough charged, therefore, even if the indication is provided, one moment of indication is enough. If the indication of charging is turned on in such a case, a good chance for photographing may be lost as the user hesitates to take a photograph as the charging is being carried out. In view of the foregoing, the indication of charging is omitted if the time required for charging the capacitor C2 is not an obstacle in actual photographing operation of the camera.

Since the charging has been started, the charging flag FCH is set in #39, and thereafter, the same operation from the step #1 is repeated. If the timer period started in #37 has lapsed, a timer interruption is generated. If the timer interruption is generated, the timer interruption flag FT is set in #63 as shown in FIG. 5 and the program returns to the original step. On this occasion, since both flags FCH, FT are set, the program proceeds from #36 to #41 through #40. In #41, the light emitting diode LED1 is turned on for indicating that the charging is being carried out, and the program returns to #17 after the foregoing operations. If the voltage V of the capacitor C2 is higher than the level V1 allowing emission of flash in #17, then the charging flag FCH is checked in #18. This is for determining whether the charging should be continued or not, as described above. If it is not necessary to continue charging, then the charging non-requested flag FFE2 is set in S19. In #20, the indication requesting flag FLED is checked. If FLED=0, there is no need of indication, so that the light emitting diodes LED1 and LED2 are turned off in #32 and the operation from the step #1 is repeated. If FLED=1, then the indication flag FFE1 is set in #21, and the light emitting diode LED2 for indicating the completion of charging is turned on in #22, a prescribed time period (for example 0.5 sec) is set in the timer in #23, and the timer operation is started. In #24, the timer interruption flag FT is reset. As described in the foregoing with reference to #37, after the lapse of the time period set in the timer, an interruption is generated, the timer flag FT is set to 1 in the step #63 shown in FIG. 5, and the program returns to a step where the interruption is generated. This timer is also used for keeping off the above mentioned indication of charging for a prescribed time period after the start of charging operation. Here the timer is used for keeping on the light emitting diode LED2 indicative of the completion of charging for a prescribed time period after the voltage V of the capacitor C2 reached the level V1 allowing emission of flash. When the timer interruption flag FT is again set by the timer which is started in #23, the timer interruption flag FT is detected in #25 and the light emitting diodes LED1 and LED2 are both turned off in #26. The reason is the following why the charging operation is stopped when the voltage of the capacitor C2 reaches the charging stop level V2 and the light emitting diode LED2 is turned off when the prescribed time period set in #23 has passed. If the light emitting diode LED2 is turned off when the voltage of the capacitor C2 reaches the charging stop level V2, there may occur some problems as follows. If the power supply battery BA is new, it takes very short time period for the voltage V of the capacitor C2 to reach the level V2 from the level V1. Therefore, if the indication of completion of charging is carried out only during this time period, the indication will be on for only a moment, so that the recognition of indication will be difficult. On the contrary, if the power supply battery BA is old, the indication will be kept on for a long period of time. In some cases, the user may consider the indication is always on, which is inconvenient in actual use of the camera.

Figure 6:
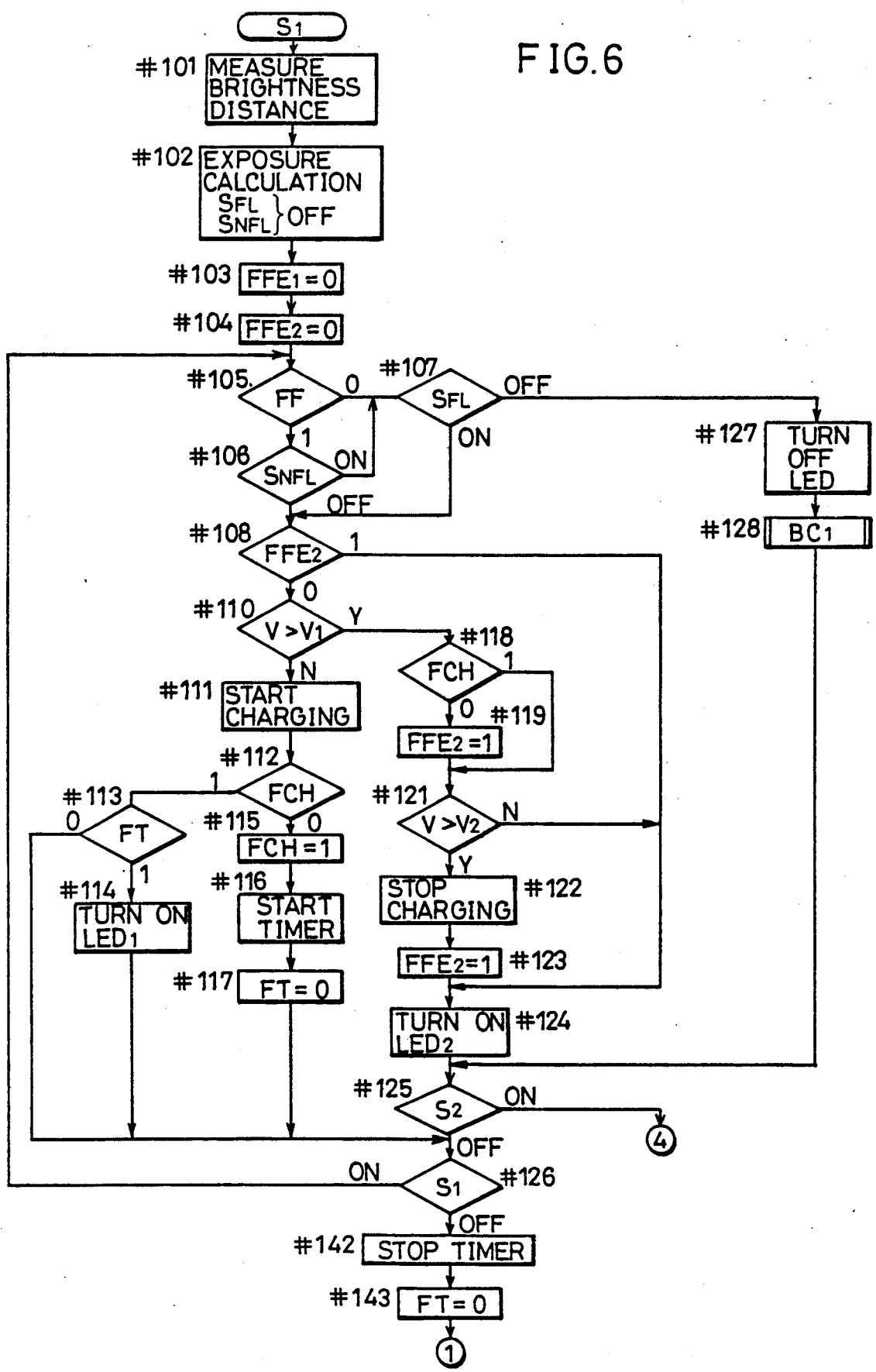
Figure 9:
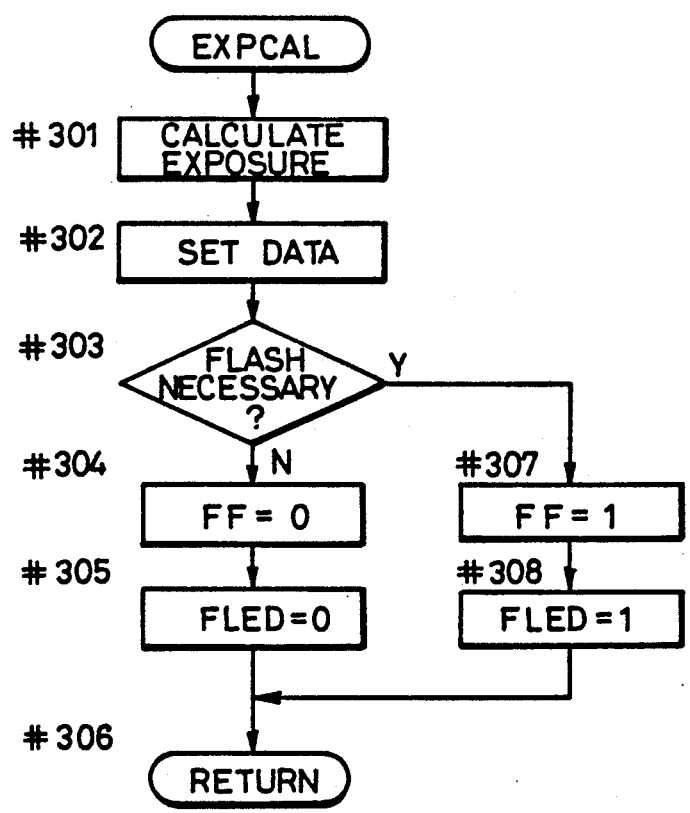

The operation when the brightness measuring·distance measuring switch S1 is turned ON will be described with reference to FIG. 6. When the brightness measuring·distance measuring switch S1 is turned on, the program proceeds from #8 to #46 as described with reference to FIG. 3, the subroutine for checking the battery is carried out and then the program proceeds to #47, that is, #101 in FIG. 6. First, in #101, the brightness measuring·distance measuring circuit AFE is operated to measure the brightness of the subject and the distance to the subject. Thereafter, the program proceeds to #102 where exposure calculation is carried out based on the data provided in #101. On this occasion, the exposure calculation is carried out assuming that the switches $S_{FL}$ and $S_{NFL}$ are both OFF, regardless of the state of the switches $S_{FL}$ and $S_{NFL}$. Namely, the exposure calculation is carried in the normal photographing mode in the step #301 of FIG. 9. Consequently, the data for controlling exposure such as shutter speed, aperture value, timing for emitting electric flash and so on are set (#302). After the step #303, the charge requesting flag FF and the indication requesting flag FLED are reset in #304 and #305 or they are set in #307 and #308. These flags FF and FLED are set when it is determined in #303 that the emission of electric flash is necessary since the brightness of the subject is low or the scene to be photographed is with rear light, in accordance with the result of the exposure calculations carried out in #301. These flags FF and FLED are reset when it is determined in #303 that the emission of electric flash is not necessary. Thereafter, in #103 and #104, FFE1 is set to 0 and FFE2 is set to 0, and the program proceeds to #105. The state of the charge requesting flag FF which is set or reset in accordance with the exposure calculation of #102 is checked. If the result of exposure calculation of #102 shows that it is not necessary to emit flash light, that is, FF =0, then the state of the switch $S_{FL}$ to force emission of electric flash is checked in #107. If this switch $S_{FL}$ is ON, then the program proceeds to #108, which will be described later. Meanwhile, if the switch $SW_{FL}$ is OFF, then the both light emitting diodes LED1 and LED2 are turned off in #127 Thereafter, the subroutine BC1 of FIG. 8 is called in #128. As described before, if the capacitor C2 is not being charged, than the program directly returns to the main flow. However, if the capacitor C2 is being charged, the charging is stopped and the battery is checked. Thereafter, the program proceeds to #125 and #126 where the state of the release switch S2 and the state of the brightness measuring.distance measuring switch S1 are checked. If the switch S2 is OFF and the switch S1 is ON, the program proceeds to #105. If it is determined in #105 from the result of the exposure calculation of #102 that it is necessary to emit flash light, then the program proceeds to #106. In #106, whether the flash emission inhibiting switch $S_{NFL}$ is ON or not is determined. If the flash emission inhibiting switch $S_{NFL}$ is ON, flash emission is inhibited, so that the program proceeds to #107 which is described above. However, if the switch $S_{FL}$ is ON in #107, that is, the flash emission inhibiting switch $S_{NFL}$ and the switch $S_{S1}$ for forcing emission of electric flash are both ON, then the priority is given to the switch $S_{FL}$ to force emission of electric flash, and the program proceeds to #108. Namely, if it is determined that the emission of electric flash is necessary from the result of the exposure calculation (#105) and the switch $S_{NFL}$ is OFF (#106), or if the switch $S_{FL}$ forcing emission of flash is ON, then the flash light must be emitted, so that the program proceeds to the steps following #108. Although the priority is given to the switch $S_{FL}$ to force emission of electric flash when the switch $S_{FL}$ to force emission of a flash and the flash emission inhibiting switch $S_{NFL}$ are simultaneously turned on in this embodiment, the priority may be given to the flash emission inhibiting switch $S_{NFL}$.

In #108, whether or not it is necessary to charge the capacitor C2 is determined in accordance with the charge non-requested flag FFE2. If the charging is necessary (FFE2=0), the program proceeds to #110 where the voltage V of the capacitor C2 is checked. If the voltage V of the capacitor C2 is lower than the level V1 allowing emission of light in #110, then the charging is started in #111. The operation from the step #112 to #117 is completely the same as that from the step

36 to #41 described with reference to FIG. 5, so that detailed description thereof will be omitted. This operation is a routine to provide indication of charging after a prescribed time period from the start of charging. If the voltage V of the capacitor C2 has not yet reached the level V1 allowing emission, then the program does not go through the step #125, so that the check of the release switch S2 is not carried out. Therefore, the releasing is inhibited (release lock). Even in that case, if the flash emission inhibiting switch $S_{NFL}$ is turned ON and the switch SFL is turned off, then the flow proceeds to #125 through the steps #107, #127 and #128, where the on/off of the release switch S2 is checked to enable releasing operation. If the voltage V of the capacitor C2 is higher than the level V1 allowing emission in #110, then the charging flag FCH is checked in #118 as in the steps #18 and #19 of FIG. 4. If FCH=0, then the charge non-requested flag FFE2 is set in #119. As described above, whether the voltage has reached the level V1 by the continuous charging or the voltage has been at the level V1 can be determined by the flag FFE2.

Thereafter, in #121, whether the voltage V of the capacitor C2 has reached the level V2 or not is determined. If the voltage V of the capacitor C2 reaches the level V2 to stop charging, then the charging is stopped in #122 and the charging non-requested flag FFE2 is set in #123. If it is stopped to charge the capacitor C2 after the capacitor C2 is fully charged, the level of the voltage gradually lowers due to a leak current and the like. However, the rate of lowering is very slow. Therefore, in the actual use, the voltage of the capacitor C2 does not become lower than the level V1 while the user keeps the brightness measuring.distance measuring switch S1 ON. Therefore, if the charge non-requested flag FFE2 has been set (#108), then charging is not carried out even if the switch $S_{FL}$ for forcing emission of flash is turned ON with the brightness measuring.distance measuring switch S1 kept ON, thereby unnecessary power consumption can be prevented. Thereafter, the light emitting diode LED2 for indicating completion of charging is turned on in #124. Thereafter, the state of the switches S2 and S1 are checked in the steps #125 and #126. And the procedure from the step #105 to #124 is repeated while the switch S1 is ON and the switch S2 is OFF. If the brightness measuring.distance measuring switch S1 is OFF, then the timer is stopped in #142, the timer interruption flag FT is reset in #143 and the program returns to the above described step #1.

Figure 7:
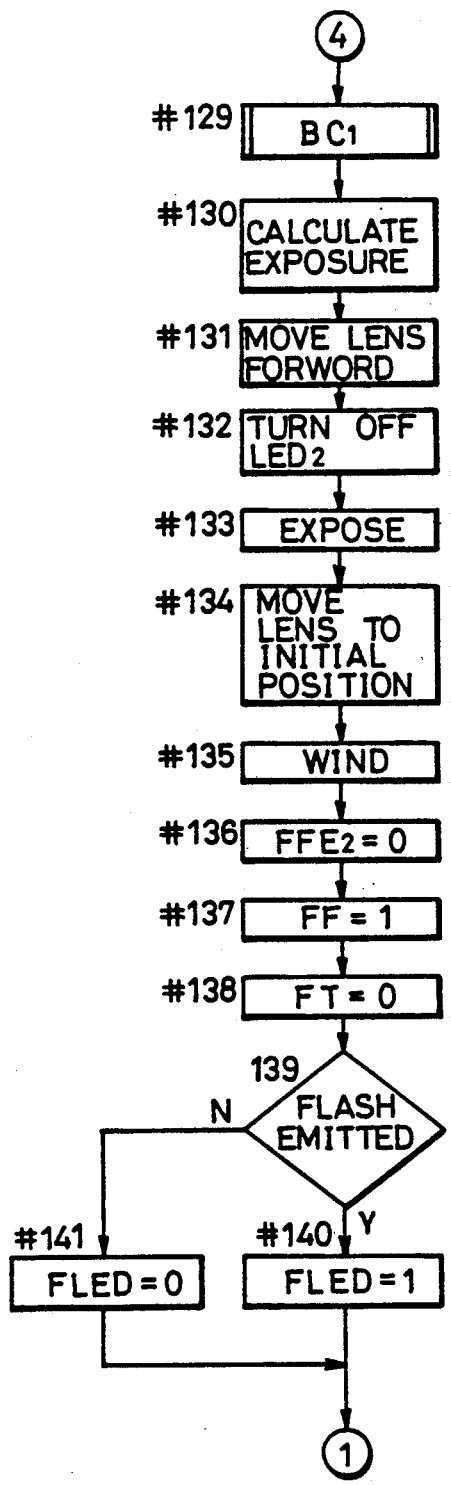

If the release switch S2 is ON in #125, then the program proceeds to the step #129 shown in FIG. 7. In #129, the subroutine BC1 for checking the battery is called. If the charging is being carried out, the charging is stopped and the battery is checked. Thereafter, the exposure calculation is again carried out in #130. Although the state of the switches $S_{FL}$ and $S_{NFL}$ are not checked in #102, the exposure calculation is carried out considering the state of the switches $S_{FL}$ and $S_{NFL}$ in #130. The exposure calculation is carried out after the turning ON of the release switch S2. Therefore, even when the state of the switch $S_{FL}$ or $S_{NFL}$ is changed immediately before the turning ON of the release switch S2, the exposure calculation can be carried out in accordance with the changed state.

In #131, the stepping motor M3 is rotated in accordance with the result of measurement of the distance, so as to move the lens to the infocus position. In #132, the light emitting diode LED2 for indicating the completion of charging is turned off. For example, if the charging is carried out with the release switch S2 ON and the voltage reaches the level V1 allowing emission in #110, the program proceeds as will be described in the following. Namely, when the light emitting diode LED2 is turned ON in #124, the program directly proceeds to the step #129. In order to let the user confirm the turning on of the LED in such a case, the light emitting diodes LED1 and LED2 are adapted to be kept on during forward movement of the lens which takes reasonable time. Thereafter the diodes are turned off.

Thereafter, in #133, the shutter is controlled based on the result of exposure calculation by the stepping motor M4 and the timing for emitting electric flash is controlled. In #134, the stepping motor M3 is rotated in the reverse direction to return the lens to the initial position. In #135, the film is wound by one frame. Thereafter, the flag FFE2 is set to 0, the flag FF is set to 1 and the flag FT is set to 0 in the steps #136, #137 and #138, respectively. The reason for this is that when photographing operation of one frame is completed and the film is wound, the capacitor C2 must be charged for the next photographing operation. In #139, #140 and #141, whether the electric flash was emitted or not in the photographing operation is checked. If the flash was emitted, then the indication requesting flag FLED is set to 1 in #140 and otherwise the indication requesting flag FLED is set to 0 in #141. Thereafter, the program again returns to the step #1 of FIG. 3 to repeat the above described operation. The indication requesting flag FLED is set or reset in accordance with the presence/absence of the emission of the electric flash from the following reason. Namely, if the flash was emitted, the voltage V of the capacitor C2 is decreased without fail, so that it can be easily recognized by the user that the charging is necessary. Therefore, the indication calls the user's attention for the preparation of the next photographing operation. If the flash was not emitted, the voltage of the capacitor C2 hardly decreases, and therefore, there is no need of charging. Therefore there is no need to indicate the state of the charging level for the user. Even if the charging is necessary as the voltage of the capacitor C2 is low, the indication of charging is unnecessary and undesirable, because, as described above, the voltage of the capacitor C2 reaches the level V1 very quickly. Therefore, the indication requesting flag FLED is set or reset in accordance with the presence/absence of the emission of the electric flash.

Figure 10:
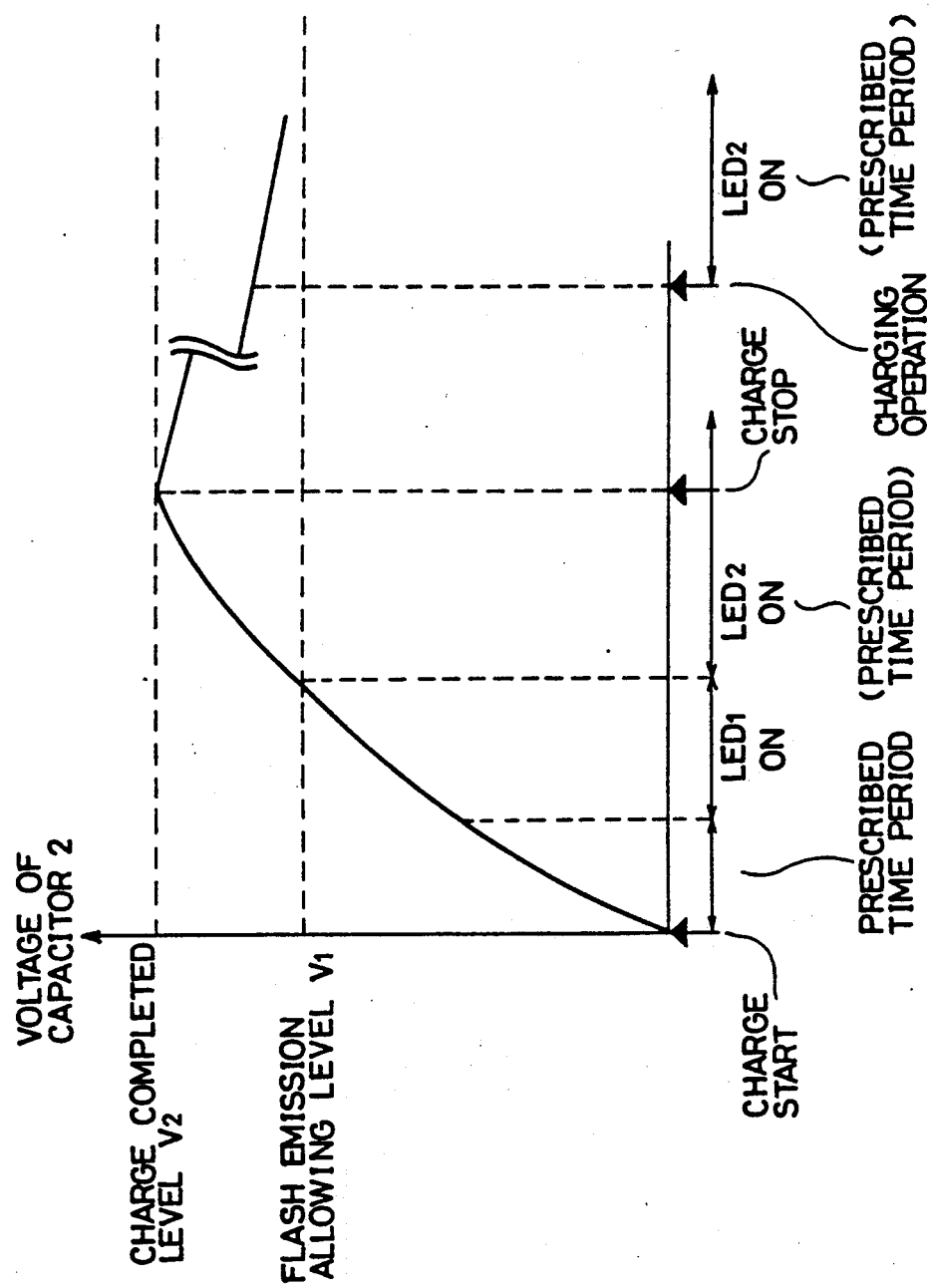
FIG. 10 is a graph showing a change in a voltage of a capacitor employed in the camera to which the present invention is applied.

FIG. 10 shows a relation among the turning on of the light emitting diodes LED1 and LED2, control of charging of the capacitor C2, and the voltage of the capacitor C2 when the switch S1 is OFF, in accordance with the above described flow chart. When the voltage V of the capacitor C2 is lower than the level V1 allowing emission of flash and an operation for charging is done, then the charging is stated. After a prescribed time period, the red light emitting diode LED1 is turned on. When the voltage V of the capacitor C2 reaches the level V1 allowing emission of flash, then the red light emitting diode LED1 is turned off and the green light emitting diode LED2 is turned on. If the voltage reaches the level V1 allowing emission of flash within the first prescribed time period, then the red light emitting diode LED1 is kept off and only the green light emitting diode LED2 is turned on. The light emitting diode LED2 is turned off after a prescribed time period. However, if the switch S1 is ON, then the light emitting diode LED2 is kept on until the releasing operation is carried out or until the switch S1 is turned OFF.

Meanwhile, if the voltage V of the capacitor C2 reaches the level V2 for stopping, charging, then the charging operation is stopped. The voltage V of the capacitor C2 gradually becomes low. If an operation such as turning ON of the switch $S_{FL}$ is done in order to start charging again, only the light emitting diode LED2 is kept ON for a prescribed time period without carrying out charging, provided that the voltage V of the capacitor C2 is still higher than the emission allowing level V1 (when S1 is on). If the user has no interest to the charging of the flash as in the case where the user opens the lens barrier, then the light emitting diodes LED1 and LED2 are not turned on as described above, although the control of charging is the same as shown in FIG. 10.

Although two light emitting diodes are used for indicating the charging and the completion of charging in the above described embodiment, the method of indication is not limited to this embodiment, e.g. only one light emitting diode may be used for the indication by keeping the diode on and by flickering the diode. In the above described embodiment, the apparatus is adapted such that the releasing operation is made possible directly after the completion of charging. In a camera having a releasing inhibiting memory in which the releasing operation is inhibited when the voltage of the capacitor does not reach the level allowing emission of flash and the inhibition is released by repressing the shutter button, a trouble in operating the camera such as the release operation is locked even if the time required for charging is very short, can be solved by adapting the memory such that the memory is set by a signal corresponding to the indication signal of the red light emitting diode LED2.

As described above, according to the present invention, in a camera having a control apparatus for charging a storage capacitor for a flash light emission, the indication of "charging is being carried out" is not provided even if the flash circuit is being charged, when the charging is completed in a prescribed time period or when the user does not intend a photographing operation with flash light emission. Therefore, when a warning in association with the charging operation is not desirable from the view point of the user, such warning is not given.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera comprising:
   (a) power supply means serving as a driving source of the camera;
   (b) boosting means connected to said power supply means for boosting potential of said power supply means to a prescribed potential;
   (c) capacitor means connected to said boosting means for storing energy;
   (d) potential detecting means for detecting the potential of said capacitor means;
   (e) boosting operation starting signal outputting means for outputting a signal for starting operation of said boosting means;
   (f) timer means responsive to said boosting operation starting signal for measuring a prescribed time period;
   (g) indicating means for deenergizing an indication corresponding to an output level of said potential detecting means before a lapse of said prescribed time period and giving the indication after the lapse of said prescribed time period;
   (h) a first operating member for switching between a first state and a second state;
   (i) controlling means for controlling said camera such that the camera is set in an operative state when said first operating member is in said first sate and in an inoperative state when said member is in said second state; and
   (j) a second operating member for starting the operation of said boosting operation starting signal outputting means when said first operating member is in said first state.

2. A camera according to claim 1, further comprising flash means for emitting flash light using the energy stored in said capacitor means.

3. A camera according to claim 1, wherein said boosting operation starting signal outputting means outputs said boosting starting signal when said first operating member is switched from said second state to said first state.

4. A camera according to claim 1, wherein said boosting operation starting signal outputting means outputs said boosting operation starting signal after a photographing operation is completed.

5. A camera, comprising:
   (a) power supply means serving as a driving source of the camera;
   (b) boosting means connected to said power supply means for boosting potential of said power supply means to a prescribed potential;
   (c) capacitor means connected to said boosting means for storing energy;
   (d) flash means for emitting flash light using the energy stored in said capacitor means;
   (e) brightness measuring means for measuring brightness of a subject;
   (f) determining means responsive to an output signal from said brightness measuring means for determining whether or not flash light is necessary;
   (g) first controlling means for outputting a boosting operation starting signal for operating said boosting means when it is determined by said determining means that the flash light is necessary;
   (h) timer means responsive to an output signal from said first controlling means for measuring a prescribed time period;
   (i) potential detecting means for detecting potential of said capacitor means; and
   (j) indicating means for deenergizing an indication corresponding to an output level of said potential detecting means before a lapse of said prescribed time period and giving the indication after the lapse of said prescribed time period.

6. A camera according to claim 5, further comprising:
   first operating member for switching between a first state and a second state;
   second controlling means for controlling said camera such that said camera is set in a operative state when said first operating member is in said first state and in an inoperative state when said first operating member is in said second state; and a second operating member for starting operation of said first controlling means when said first operating member is in said first state; wherein
said brightness measuring means is operated when said first operating member is in said first state.

7. A camera according to claim 5, wherein said first controlling means output said boosting starting signal after a photographing operation is completed.

8. A camera according to claim 5, further comprising:
a first operating member for switching between a first state and the second state;
a second controlling means for setting said camera in an operative state when said first operating member is in said first state and in an inoperative state when said first operating member is in said second state;
a second operating member for outputting a signal to start operation of said first control means when said first operating member is in said first state;
exposure control means responsive to an output signal from said second operating member for controlling exposure; and
inhibiting means for inhibiting operation of said exposure controlling means when it is determined by said potential detecting means that the potential of said capacitor is lower than a prescribed potential.

9. A camera, comprising:
(a) power supply means serving as a driving source of the camera;
(b) boosting means connected too said power supply means for boosting potential of said power supply means to a prescribed potential;
(c) capacitor means connected to said boosting means for storing energy;
(d) potential detecting means for detecting the potential of said capacitor means;
(e) indicating means for indicating operational state of said boosting means;
(f) a manual operable member;
(g) exposure control means for controlling an exposure operation of aid camera inn response to manual operation of said manual operable member; and
(h) inhibiting means for inhibiting indication of said indicating means in response to the exposure control operation.

10. A camera comprising:
(a) power supply means serving as a driving source of the camera;
(b) boosting means connected to said power supply means for boosting potential of said power supply means to a prescribed potential;
(c) capacitor means connected to said boosting means for storing energy;
(d) potential detecting means for detecting the potential of said capacitor means;
(e) timer means for measuring a prescribed time period from start of boosting operation;
(f) indicating means for giving an indication corresponding to an output level of said potential detecting means; and
(g) determining means for determining based on a photographing condition whether or not said indication after a lapse of said prescribed time period is to be given.

11. A camera according to claim 9, further comprising:
flash means for emitting flash light using the energy stored in said capacitor means.

12. A camera according to claim 10, further comprising
flash means for emitting flash light using the energy stored in said capacitor means.

13. A camera according to claim 12, further comprising:
flash control means for selectively controlling said flash means depending on an operation mode of aid camera whether said mode is an emitting mode or a non-emitting mode, said flash being emitted in the case of said camera being in said emission mode and said flash being not emitted in the case of in said non-emission mode during exposure control;
determining means for determining the mode of said camera during said exposure control operation,
wherein said photographing condition is in said non-emission mode.

14. A camera according to claim 9, wherein said inhibiting means starts its operation in response to the start of the operation of said exposure control means.

15. A camera according to claim 14 wherein said boosting means starts its operation after the completion of the operation of said exposure control means;
said camera further comprising;
timer means for measuring a prescribed time period from the start of the operation of said boosting means; and
relieving means for relieving said inhibition after a lapse of said prescribed time period.

16. A camera according to claim 15, further comprising:
flash means for emitting flash light using the energy supplied by said capacitor;
flash control means for selectively controlling said flash means depending on an operation mode of sad camera whether said mode is an emitting mode or a non-emitting mode, said flash being emitted in the case of said camera being in said emission mode and said flash being not emitted din the case of in said non-emission mode during exposure control;
determining means for determining the mode of said camera during said exposure control operation; and
inhibition continuing means for inhibiting an operation of said relieving means if the operation mode during said exposure control operation is said non-emission mode depending on the output of said determining means.

17. A camera, according to claim 9, wherein
said inhibiting means inhibit said indication after said exposure control operation.

18. A camera according to claim 17, further comprising:
flash means for emitting flash light using the energy supplied by said capacitor;
flash control means for selectively controlling said flash means depending on an operation mode of said camera whether said mode is an emitting mode or a non-emitting mode, said flash being emitted in the case of said camera being in said emission mode and said flash being not emitted inn the case of in said non-emission mode during exposure control;
determining means for determining the mode of said camera during said exposure control operation; wherein
said inhibiting means inhibits said indication if it is determined that the operation mode during exposure control operation is said non-emission mode.

* * * * *